United States Patent [19]

Kubota

[11] 4,385,495
[45] May 31, 1983

[54] FLUID RESERVOIR FOR TANDEM MASTER CYLINDER

[75] Inventor: Hitoshi Kubota, Fujisawa, Japan

[73] Assignee: Nissan Motor Co., Ltd., Yokohama, Japan

[21] Appl. No.: 203,932

[22] Filed: Nov. 4, 1980

[30] Foreign Application Priority Data

Nov. 12, 1979 [JP] Japan .................. 54-145473

[51] Int. Cl.³ .............................. F15B 7/00
[52] U.S. Cl. ...................... 60/535; 60/562; 60/592
[58] Field of Search .......... 60/585, 592, 534, 535, 60/562; 220/22; 73/308; 137/262

[56] References Cited

U.S. PATENT DOCUMENTS

| | | | |
|---|---|---|---|
| 3,542,055 | 11/1970 | Belart | 137/255 |
| 3,744,513 | 7/1973 | Leitenberger | 60/562 |
| 4,103,492 | 8/1978 | Sakazume | 60/592 |
| 4,133,178 | 1/1979 | Brooks, Sr. | 60/592 |
| 4,133,287 | 1/1979 | Downs | 60/592 |
| 4,166,431 | 9/1979 | Pickering | 60/585 |
| 4,170,877 | 10/1979 | Pickering | 60/592 |
| 4,217,922 | 8/1980 | Come | 60/592 |

FOREIGN PATENT DOCUMENTS

| | | |
|---|---|---|
| 2642853 | 3/1977 | Fed. Rep. of Germany ........ 60/592 |
| 2834789 | 2/1980 | Fed. Rep. of Germany . |
| 2255199 | 7/1975 | France . |
| 2258993 | 8/1975 | France . |
| 2287369 | 5/1976 | France . |
| 54-47118 | 4/1979 | Japan ..................... 60/592 |

Primary Examiner—Abraham Hershkovitz
Attorney, Agent, or Firm—Thompson, Birch, Gauthier & Samuels

[57] ABSTRACT

A fluid reservoir for a tandem master cylinder. The fluid reservoir is of a type having therein, as one unit body, two chambers each for supplying hydraulic fluid to each of two pistons of the tandem master cylinder. These two chambers are separated into the right and left sides in the reservoir by at least one partition wall extending longitudinally of the cylinder. The bottom of each chamber is inclined to slope down longitudinally of the cylinder and its fluid outlet communicating with the cylinder is formed at the lowest part of the bottom. A fluid warning device and fluid passages connecting the two chambers are located near a vertical plane passing through the center of mass of the hydraulic fluid in the reservoir and extending laterally of the cylinder.

5 Claims, 7 Drawing Figures

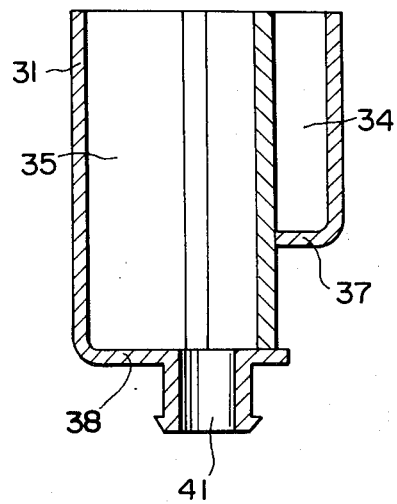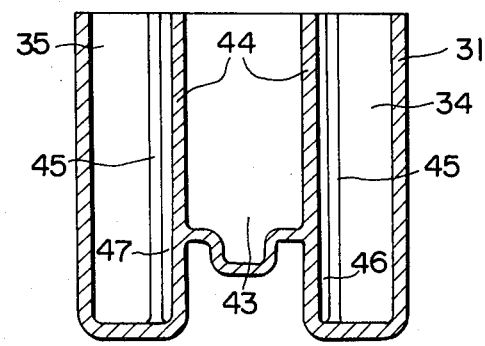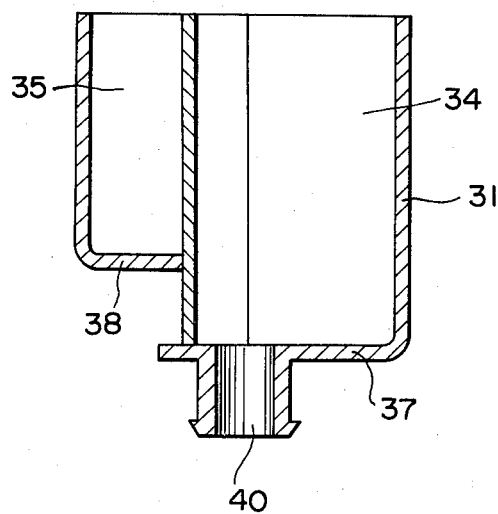

FLUID RESERVOIR FOR TANDEM MASTER CYLINDER

BACKGROUND OF THE INVENTION

1. Field of the Invention

The present invention relates generally to a fluid reservoir for a tandem master cylinder which is particularly but not exclusively applicable to a vehicle such as an automobile, and more specifically to a fluid reservoir having therein as one unit body a primary chamber to supply hydraulic fluid to a primary side of a tandem master cylinder and a secondary chamber to supply hydraulic fluid to a secondary side of the cylinder.

2. Description of the Prior Art

In a tandem master cylinder or dual master cylinder, there are provided two pistons, primary and secondary, in the same cylinder bore, one behind the other, and each piston has its own fluid reservoir. Accordingly, it is quite natural to provide two fluid reservoirs, one behind the other longitudinally of the cylinder. Such is also the case with a fluid reservoir of a type having, in one unit body, two separate chambers, each for one of two pistons. However, in a fluid reservoir of such a conventional design, the inclination of the master cylinder brings about an undesired difference in fluid level between both chambers because both chambers are spaced longitudinally.

SUMMARY OF THE INVENTION

It is an object of the present invention to provide a fluid reservoir for a tandem master cylinder which is arranged to minimize the influence of the inclination of the master cylinder to which the fluid reservoir is attached, and to efficiently use the hydraulic fluid in the reservoir.

According to the present invention, a fluid reservoir is mounted on a tandem master cylinder, and comprises a primary chamber and a secondary chamber which are separated into the right and left sides in the fluid reservoir by at least one partition wall extending longitudinally of the cylinder. Each of the chambers has a fluid outlet communicating with one side, primary or secondary, of the cylinder for supplying hydraulic fluid. Preferably the bottom of each of the two chambers is inclined to slope down longitudinally of the cylinder and its fluid outlet is formed at the lowest part of the bottom. It is advantageous to connect the two chambers by a fluid passage formed near a vertical plane passing through the center of mass of the hydraulic fluid in the reservoir and extending laterally of the fluid in the reservoir and laterally of the cylinder, and to provide a fluid level indicating means arranged to be responsive to the fluid level at a section near the vertical plane.

BRIEF DESCRIPTION OF THE DRAWINGS

FIG. 5 is a vertical sectional view taken along line V—V of FIG. 4;

FIG. 6 is a vertical sectional view taken along line VI—VI of FIG. 4;

FIG. 7 is a vertical sectional view taken along the line VII—VII of FIG. 4.

DETAILED DESCRIPTION OF THE INVENTION

Figure 1:
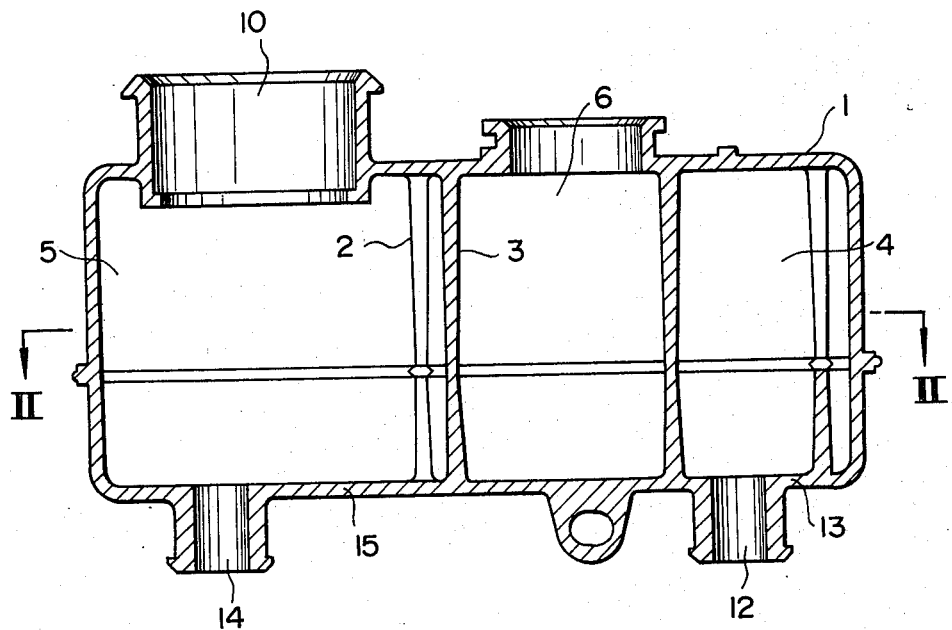
FIG. 1 is a vertical longitudinal sectional view of a conventional fluid reservoir for a tandem master cylinder.
Figure 2:
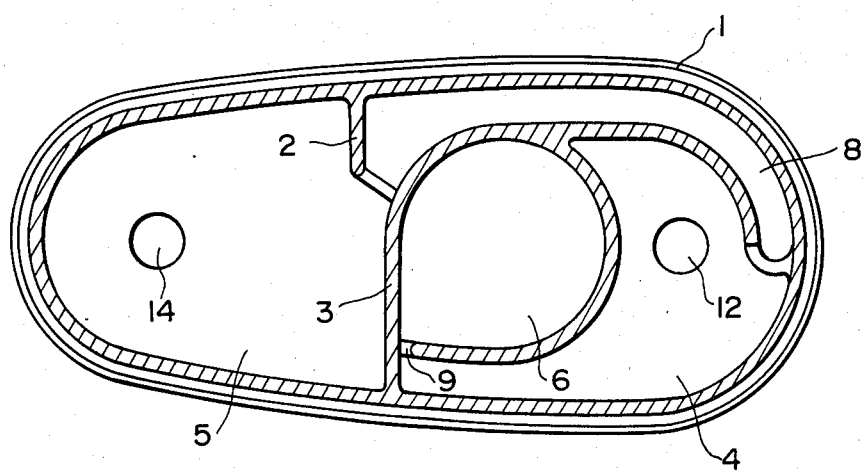
FIG. 2 is a horizontal sectional view of the conventional fluid reservoir taken along line II—II of FIG. 1.
Figure 3:
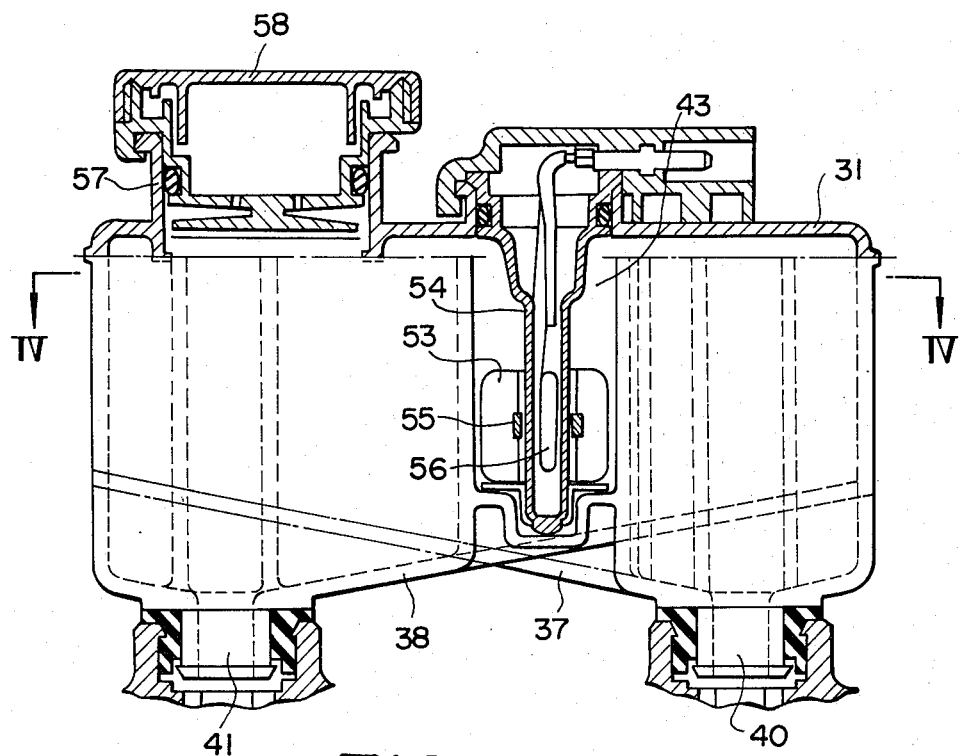
FIG. 3 is a vertical longitudinal sectional view of the fluid reservoir embodying the present invention.

Referring first to FIGS. 1 and 2, a brief reference will be made to a conventional fluid reservoir for a tandem master cylinder. A fluid reservoir 1 having an oval shape is divided by partition walls 2, 3 extending laterally of the reservoir 1, the master cylinder, or the vehicle on which the master cylinder is mounted, into a primary chamber 4 in the rear part of the reservoir 1 and a secondary chamber 5 in the front part of the reservoir 1. A third chamber 6 for measuring the fluid level in the fluid reservoir 1 is formed in the central part of the reservoir 1 between the primary and the secondary chambers 4, 5. Fluid passages 8, 9 are provided for allowing hydraulic fluid from a fluid inlet 10 to flow into the primary and the secondary chambers 4, 5 and into the third chamber 6. Th primary chamber 4 has a fluid outlet 12 formed in the flat bottom 13 thereof. The secondary chamber 5 has a fluid outlet 14 formed in the flat bottom 15 thereof. However, such a conventional fluid reservoir is readily influenced by the inclination of the master cylinder because the primary and the secondary chambers 4, 5 are spaced longitudinally of the reservoir or longitudinally of the master cylinder.

The master cylinder is mounted on a support member such as a vehicle body at various angles from a horizontal plane because of numerous structural, installation and/or chance factors causing variations from the horizontal plane of the mounting angle. Therefore, the fluid level in one of the primary or the secondary chambers 4, 5 becomes higher or lower than that of the other. This is one of the drawbacks of the conventional fluid reservoir. The conventional fluid reservoir has a further drawback in that there is some amount of hydraulic fluid which is unavailable for use, because the bottoms of the primary and the secondary chambers 4, 5 are flat.

In view of the above description, reference is now made to FIGS. 3-7, wherein a preferred embodiment of the fluid reservoir of the present invention is shown.

Figure 4:
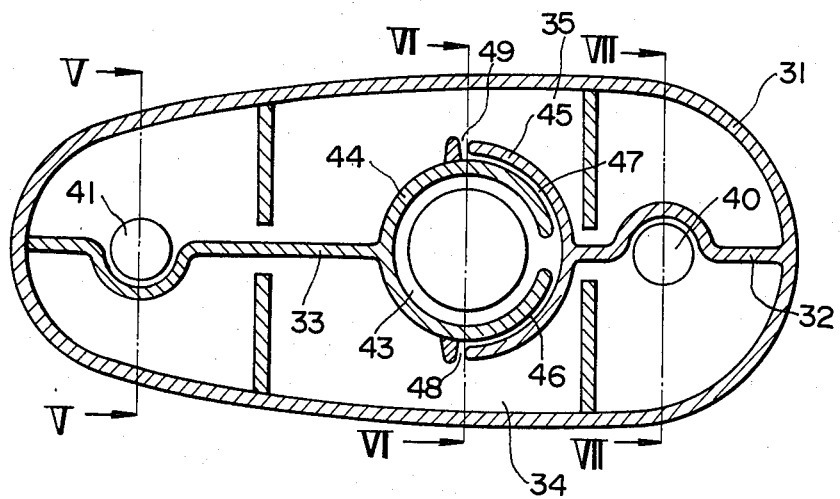
FIG. 4 is a horizontal sectional view taken along line IV—IV of FIG. 3.

As best shown in FIG. 4, a fluid reservoir 31 having a section of an oval shape is divided by partition walls 32, 33 extending longitudinally (meaning lengthwise) of the reservoir 31 or the master cylinder along the center line of the reservoir 31, into a primary chamber 34 and a secondary chamber 35, so that the two chambers 34, 35 are placed on opposite sides of the center line of the reservoir 31.

The bottom 37, 38 of each of the primary and the secondary chambers 34, 35 is inclined along the longitudinal direction to slope down toward its respective fluid outlet 40, 41 so that the fluid outlet is at the lowest part of the chamber. The angle of the bottoms inclination with respect to horizontal is larger than the angle of mounting of the master cylinder with respect to horizontal.

A third chamber 43 is formed in the central part of the reservoir 31 by partition walls 44, 45 which are arranged to encircle the third chamber. The third chamber 43 is connected with the primary chamber 34 and the secondary chamber 35, respectively, by connecting passages 46, 47 formed between the partition walls 44, 45. Each of the connecting passages 46, 47 is arranged such that its open end 48, 49 opening into the primary or the secondary chambers 34, 35 is located near a vertical plane passing through the center of mass of the hydraulic fluid in the reservoir 31 and extending laterally of the reservoir, so that the fluid levels in each chamber are maintained equal. There is provided in the third chamber 43 a fluid level warning device which comprises a float 53 movable up and down along a hollow shaft 54, a magnet 55 attached to the float 53, and a reed switch 56 inserted in the hollow shaft 54. With this arrangement, the float 53 moves down with a decrease of the fluid amount and reaches a prescribed position, where the float 53 actuates the reed switch 56 to light a warning lamp. Thus, the fluid level warning device can give a warning against the decrease of fluid amount in the reservoir 31 in its early stage. Reference numeral 57 denotes a fluid inlet and 58 its cap.

According to the present invention, the primary and the secondary chambers are separated by the longitudinally extending partition walls and are thus placed side by side. Furthermore, the connecting passages 46, 47 are arranged to open, respectively, into the primary and the secondary chambers near a vertical plane passing through the center of mass of the fluid in the reservoir and extending laterally of the reservoir, and each chamber bottom is inclined to slope down toward the respective fluid outlet at an angle greater than the maximum of the mounting angle of the master cylinder with respect to horizontal. Therefore, the variations in the mounting angle of the master cylinder do not cause a difference in fluid amount between the primary chamber and the secondary chamber, and all fluid in the reservoir is available for use. Furthermore, the open ends of the connecting passages are located at the center of mass of the hydraulic fluid in the reservoir where the fluid level is not varied by the inclination of the reservoir, so tht the warning device accurately detects the fluid level in both reservoir chambers.

What is claimed is:

1. A fluid reservoir for supplying hydraulic fluid to a horizontally extending tandem master brake cylinder, said reservoir being mounted on top of and extending lengthwise substantially parallel to the horizontal axis of the brake cylinder, said reservoir comprising:

a primary chamber extending the full length of said reservoir and having a primary fluid outlet communicating with a primary side of the cylinder, a secondary chamber extending the full length of said reservoir and having a secondary fluid outlet communicating with a secondary side of the cylinder, vertical partition wall means extending the full length of said reservoir for structurally separating said primary chamber from said secondary chamber, said partition wall means including means for permitting fluid communication between said primary and secondary chambers, and said primary chamber and said secondary chamber each having a floor which slopes down lengthwise substantially the full length of said reservoir, one of said chamber floors sloping down lengthwise in one direction, and the other of said chamber floors sloping down lengthwise in the opposite direction, each said fluid outlet being formed at the lowest point in each said sloping floor.

2. The fluid reservoir of claim 1 wherein said fluid communicating means includes a fluid passage connecting both said chambers, said fluid passage being formed near a vertical plane which extends widthwise of said reservoir, said vertical plane passing through the center of mass of the hydraulic fluid in said reservoir.

3. The fluid reservoir of claim 2, further comprising fluid level indicating means for detecting the fluid level in said reservoir near said vertical plane and for giving a warning when the fluid level decreases below a predetermined level.

4. The fluid reservoir of claim 3, further comprising a third chamber formed in the central part of said reservoir between said primary and said secondary chambers, said fluid communicating means permitting fluid communication between said primary, secondary, and third chambers, said fluid level indicating means being located in said third chamber approximately on said vertical plane.

5. The fluid reservoir of claim 1 wherein said primary fluid outlet and said secondary fluid outlet are horizontally aligned.

* * * * *